US 10,240,373 B2

(12) United States Patent
Amante et al.

(10) Patent No.: US 10,240,373 B2
(45) Date of Patent: Mar. 26, 2019

(54) MODULAR LATCH SYSTEM

(71) Applicant: Bell Helicopter Textron Inc., Fort Worth, TX (US)

(72) Inventors: William A. Amante, Grapevine, TX (US); Arunkumar Koppa Siddalingappa, Tumkur (IN)

(73) Assignee: Bell Helicopter Textron Inc., Fort Worth, TX (US)

( * ) Notice: Subject to any disclaimer, the term of this patent is extended or adjusted under 35 U.S.C. 154(b) by 0 days.

(21) Appl. No.: 15/401,979

(22) Filed: Jan. 9, 2017

(65) Prior Publication Data

US 2018/0195324 A1     Jul. 12, 2018

(51) Int. Cl.

| E05C 9/04 | (2006.01) |
|---|---|
| B64C 1/14 | (2006.01) |
| E05B 79/20 | (2014.01) |
| E05B 83/38 | (2014.01) |
| E05C 9/08 | (2006.01) |

(52) U.S. Cl.
CPC ............ *E05C 9/046* (2013.01); *B64C 1/1407* (2013.01); *E05B 79/20* (2013.01); *E05B 83/38* (2013.01); *E05C 9/085* (2013.01)

(58) Field of Classification Search
CPC ..... B64C 1/1407; B64C 1/1423; B64C 1/143; B64C 1/14; B64C 1/1438; B64C 1/1484; B64C 1/32; E05B 79/20; E05B 83/38; E05C 9/046; E05C 9/085
See application file for complete search history.

(56) References Cited

U.S. PATENT DOCUMENTS

| 2,797,884 | A | * | 7/1957 | Peed, Jr. ............... | B64C 1/1407 114/117 |
|---|---|---|---|---|---|
| 2,910,255 | A | * | 10/1959 | Johnson .................... | B64C 1/14 244/129.6 |
| 3,085,297 | A | * | 4/1963 | Linderfelt ............ | B64C 1/1407 244/129.5 |
| 3,131,892 | A | * | 5/1964 | Moises .................... | B64C 1/14 244/129.5 |
| 3,885,761 | A | * | 5/1975 | Pendergast ............... | B64C 1/32 102/314 |
| 4,470,566 | A | * | 9/1984 | Fitzgerald ............ | B64C 1/1407 244/129.1 |
| 4,666,106 | A | * | 5/1987 | Kohout .................... | B64C 1/14 244/129.3 |
| 5,156,359 | A | | 10/1992 | Noble et al. | |
| 5,337,977 | A | | 8/1994 | Fleming et al. | |

(Continued)

FOREIGN PATENT DOCUMENTS

WO     0104442     1/2001

OTHER PUBLICATIONS

European Search Report; European Application No. 17154691.4; dated Aug. 10, 2017; 4 pages.

(Continued)

*Primary Examiner* — Justin B Rephann
(74) *Attorney, Agent, or Firm* — Lightfoot & Alford PLLC (57) ABSTRACT

A modular latch system has an activation module comprising an activation rod, a latch module comprising a biased latch, and a control cable connecting the activation module to the latch module so that rotation of the activation rod can retract the latch.

14 Claims, 13 Drawing Sheets

(56) References Cited

U.S. PATENT DOCUMENTS

| | | | | |
|---|---|---|---|---|
| 5,636,814 A | * | 6/1997 | Rollert | B64C 1/1407 |
| | | | | 192/71 |
| 5,826,824 A | * | 10/1998 | Martin | B64C 1/32 |
| | | | | 244/129.3 |
| 6,341,748 B1 | * | 1/2002 | Brooks | B64C 1/1407 |
| | | | | 244/129.5 |
| 6,427,383 B1 | * | 8/2002 | Brooks | B64C 1/32 |
| | | | | 49/141 |
| 8,333,036 B2 | * | 12/2012 | Helms | B60J 1/085 |
| | | | | 49/141 |
| 8,833,840 B2 | * | 9/2014 | Diamant | B60J 1/16 |
| | | | | 296/190.11 |
| 9,718,554 B2 | * | 8/2017 | Lafon | B64D 25/16 |
| 2005/0236847 A1 | | 10/2005 | Taniyama | |
| 2014/0259935 A1 | * | 9/2014 | Steger | B64C 1/32 |
| | | | | 49/141 |

OTHER PUBLICATIONS

Office Action in related European Patent Application No. 17154691.4, dated Sep. 4, 2017, 5 pages.
Office Action in related European Patent Application No. 17154691.4, dated Jun. 15, 2018, 5 pages.

* cited by examiner

MODULAR LATCH SYSTEM

BACKGROUND

Vehicle door latch systems, such as, but not limited to, door latch systems for helicopters, other aircraft and motor vehicles are sometimes disposed within an interior of a door. In many cases, installation of the latch system can be difficult and/or time consuming because many different components must be located within the interior of the door, secured relative to the door, and/or carefully fished into portions of the interior of the door with very little clearance. Further, many door latch systems require exacting part alignment between the activation componentry and the latch tongue assemblies. Still further, many latch systems require specialized or customized parts specific to the location and/or side of the aircraft the components are to be installed. And further, many latch systems require specialized installation tooling to properly locate and install parts relative to each other for proper alignment and to alleviate tolerance stack up issues common in manufacturing door products. latch system is very independent of any door frame thusly the mechanism can still properly operate or be quality inspected without being mounted to any door frame.

DETAILED DESCRIPTION

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Figure 1:
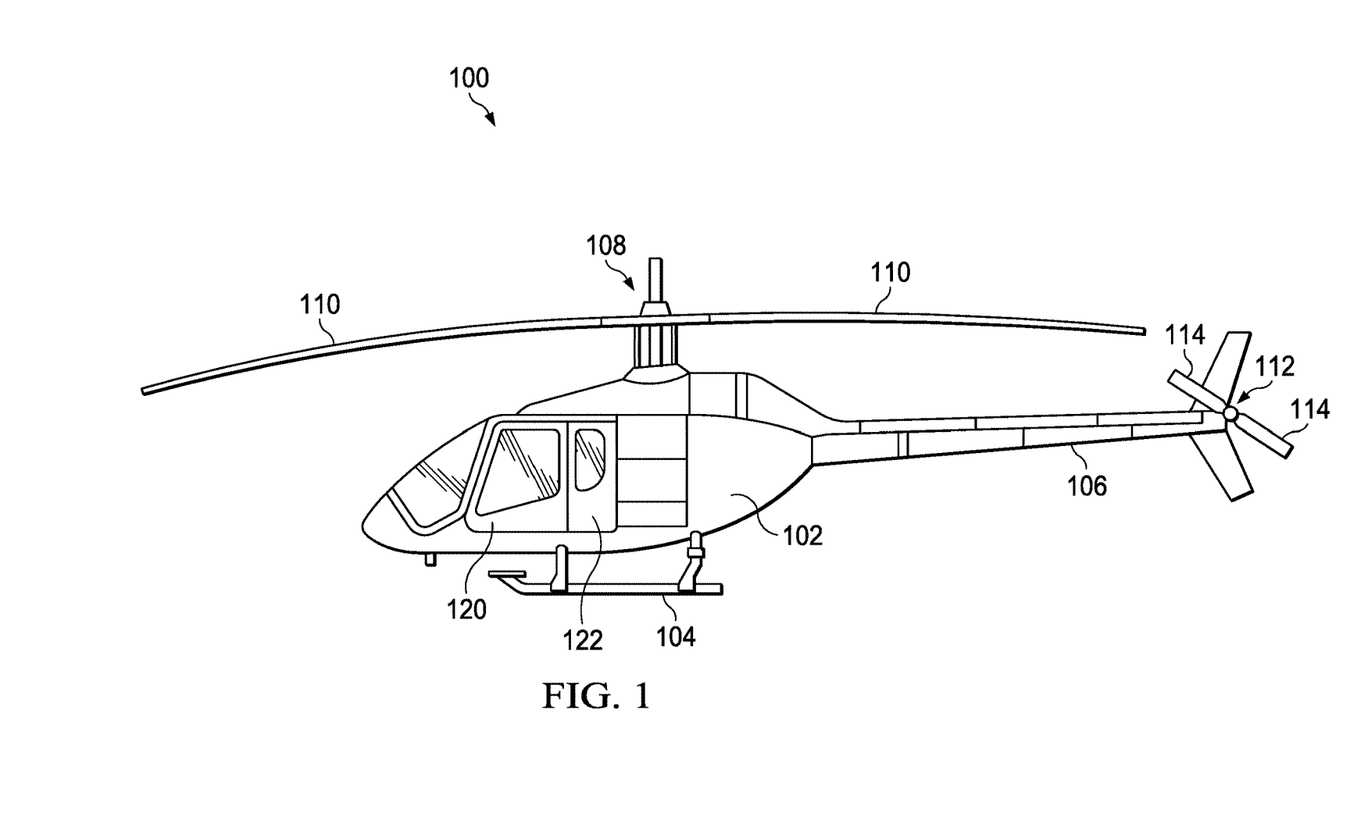
FIG. 1 is an orthogonal left side view of a helicopter according to an embodiment of this disclosure.
Figure 2:
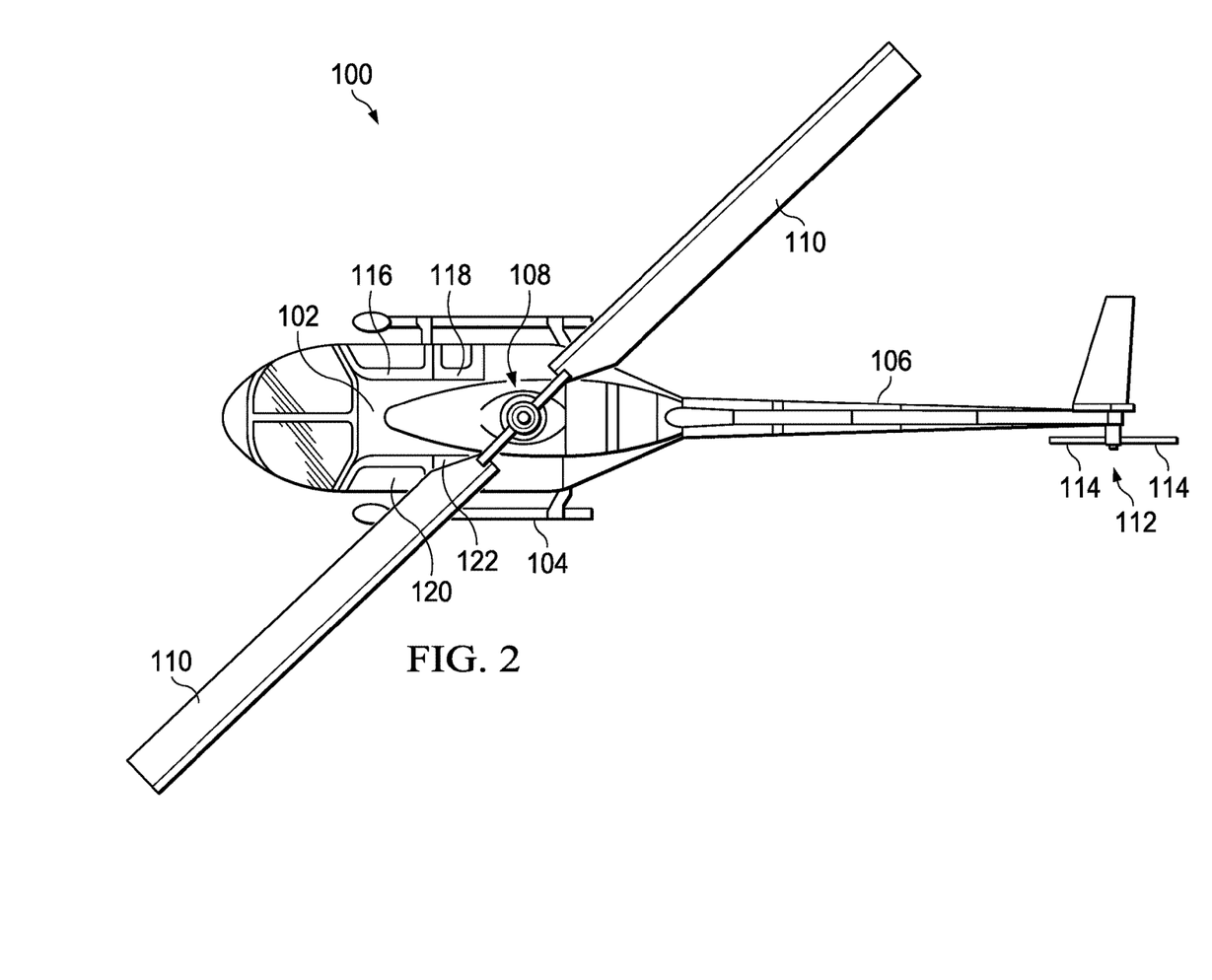
FIG. 2 is an orthogonal top view of the helicopter of FIG. 1.
Figure 3:
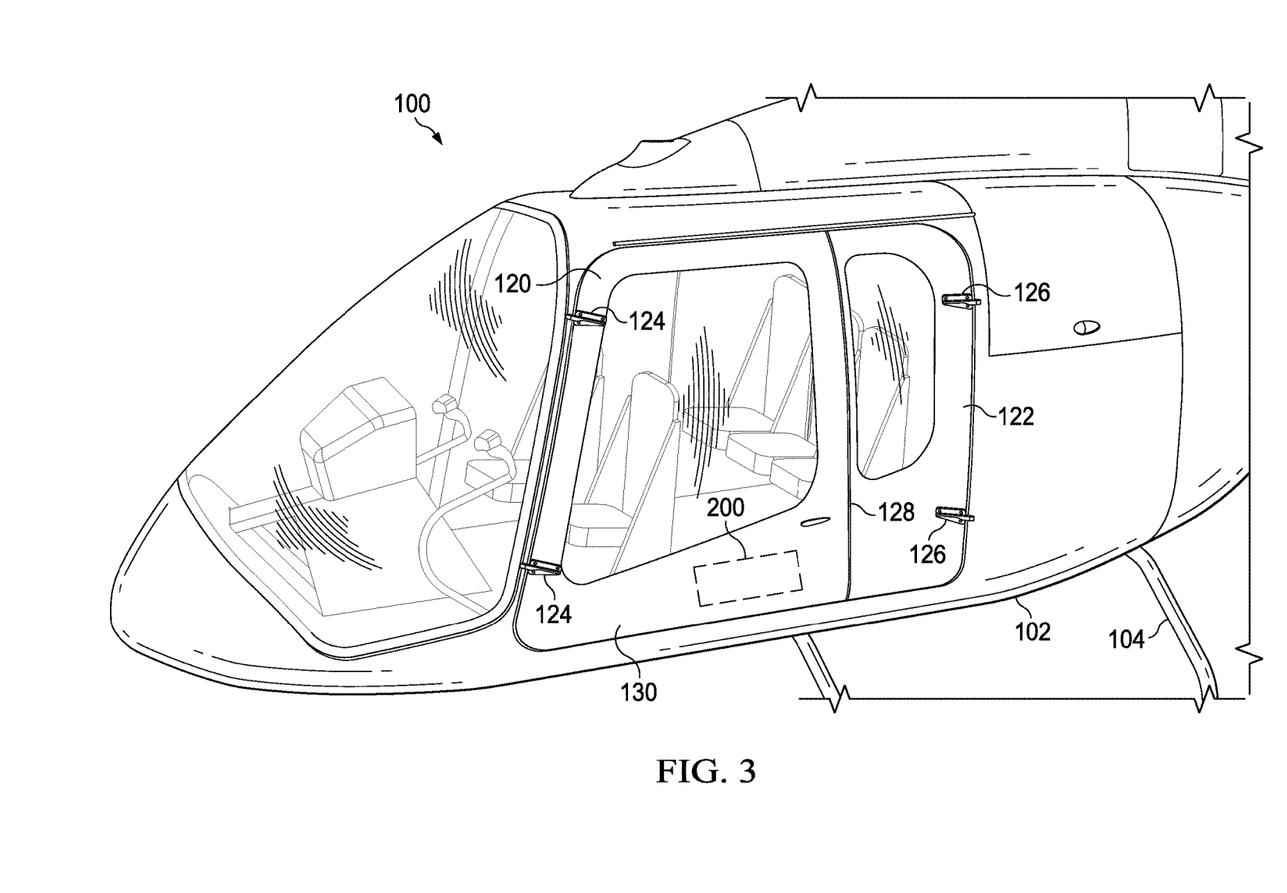
FIG. 3 is a partial oblique left side view of the helicopter of FIG. 1 showing doors of the helicopter of FIG. 1 in greater detail.
Figure 4:
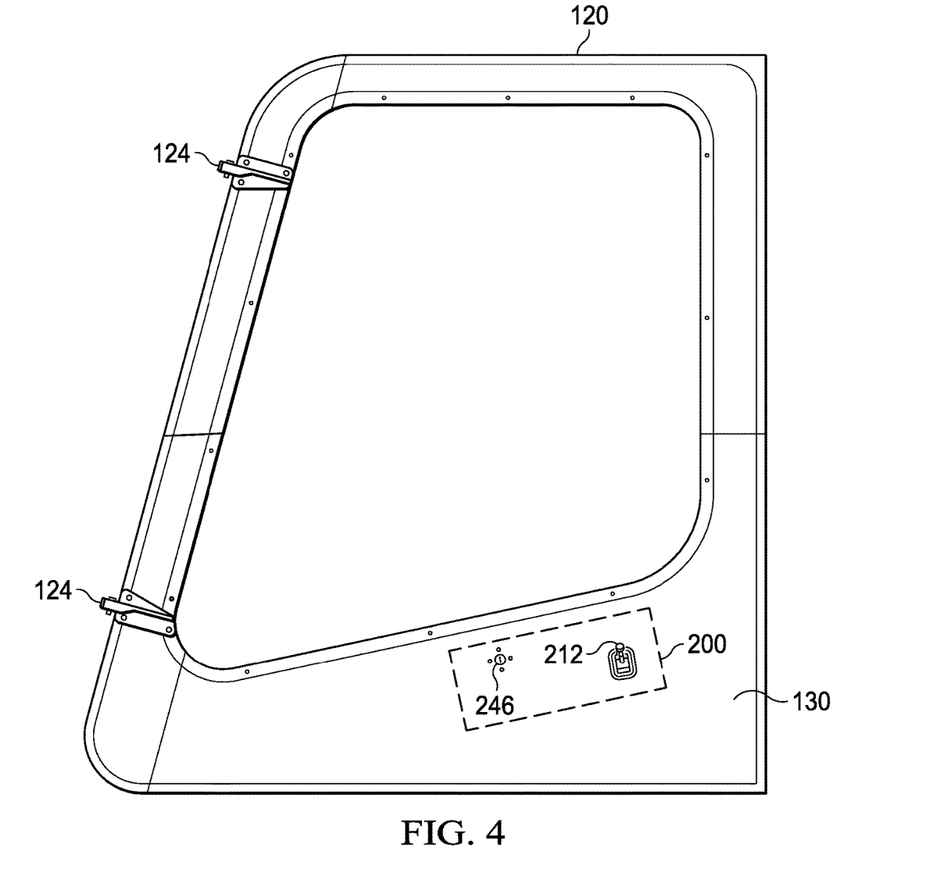
FIG. 4 is an orthogonal left side view of a fore left door of FIG. 3.

Referring to FIGS. 1-3 in the drawings, a helicopter 100 is illustrated. Helicopter 100 can include a fuselage 102, a landing gear 104, a tail member 106, a main rotor system 108 comprising main rotor blades 110, and a tail rotor system 112 comprising tail rotor blades 114. The main rotor blades 110 and the tail rotor blades 114 can be rotated and selectively controlled in order to selectively control direction, thrust, and lift of helicopter 100. The helicopter 100 further comprises a fore right door 116, an aft right door 118, a fore left door 120, and an aft left door 122. In this embodiment, the fore right door 116 and the fore left door 120 are attached to the fuselage 102 via fore hinges 124 which allow an aft portion of the fore right door 116 and an aft portion of the fore left door 120 to rotate away from the fuselage 102. Also, the aft right door 118 and the aft left door 122 are attached to the fuselage 102 via aft hinges 126 which allow a fore portion of the aft right door 118 and a fore portion of the aft left door 122 to rotate away from the fuselage 102. In this embodiment, each of the aft right door 118 and the aft left door 122 comprise a lip against which an aft portion of the fore right door 116 and an aft portion of the fore left door 120 are configured to overlap.

In other words, the aft right door 118 and the aft left door 122 must be in closed positions against the fuselage 102 before proper closure of the fore right door 116 and the fore left door 120 can be accomplished. Further, when starting from completely closed positions, the fore right door 116 must be at least partially opened before the aft right door 118 can be opened and the fore left door 120 must be at least partially opened before the aft left door 122 can be opened. In this embodiment, each of the fore right door 116 and the fore left door 120 carry a modular latch system (MLS) 200 configured to selectively control opening and closing the fore right door 116 and the fore left door 120. In this embodiment, the fore right door 116 and the fore left door 120 are substantially symmetrical or mirror images of each other. However, in this embodiment, the MLS 200 carried by the fore right door 116 is not completely symmetrical or a mirror image of the MLS 200 carried by the fore left door 120. Instead, the MLSs 200 are substantially the same, with only a very limited number of components being symmetrical or mirror images of each other. Because a great majority of the components of the MLSs 200 are identical, the number of different parts required to fully construct the helicopter 100 is reduced. Most generally, the MLSs 200 are carried within an interior of the fore right door 116 and fore left door 120. More specifically, the MLSs 200 are carried by an interior panel 128 of the fore right door 116 and fore left door 120 and further enclosed within the interior of the fore right door 116 and fore left door 120 by an exterior panel 130 that together with the interior panel 128 define an interior space of the fore right door 116 and fore left door 120.

Figure 5:
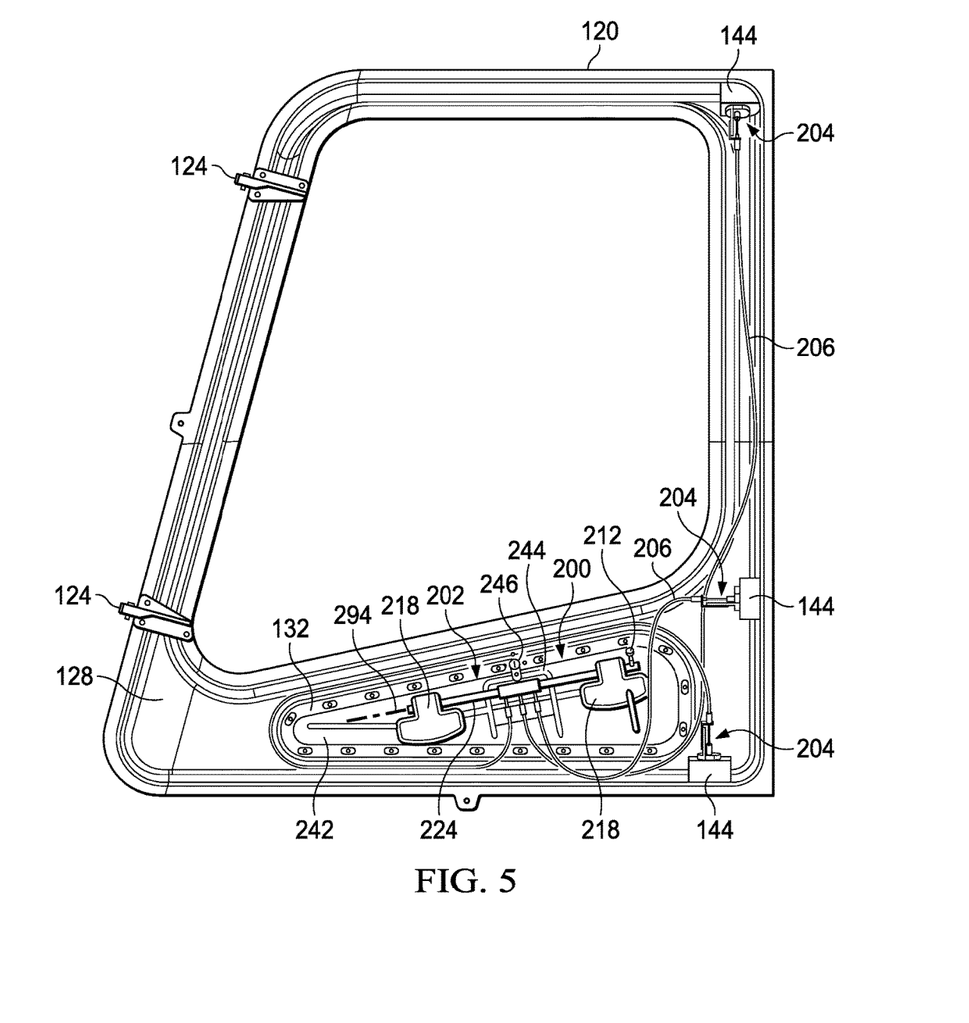
FIG. 5 is an orthogonal left side view of the fore left door of FIG. 3 with an exterior skin removed and showing a modular latch system of the helicopter of FIG. 1.
Figure 7:
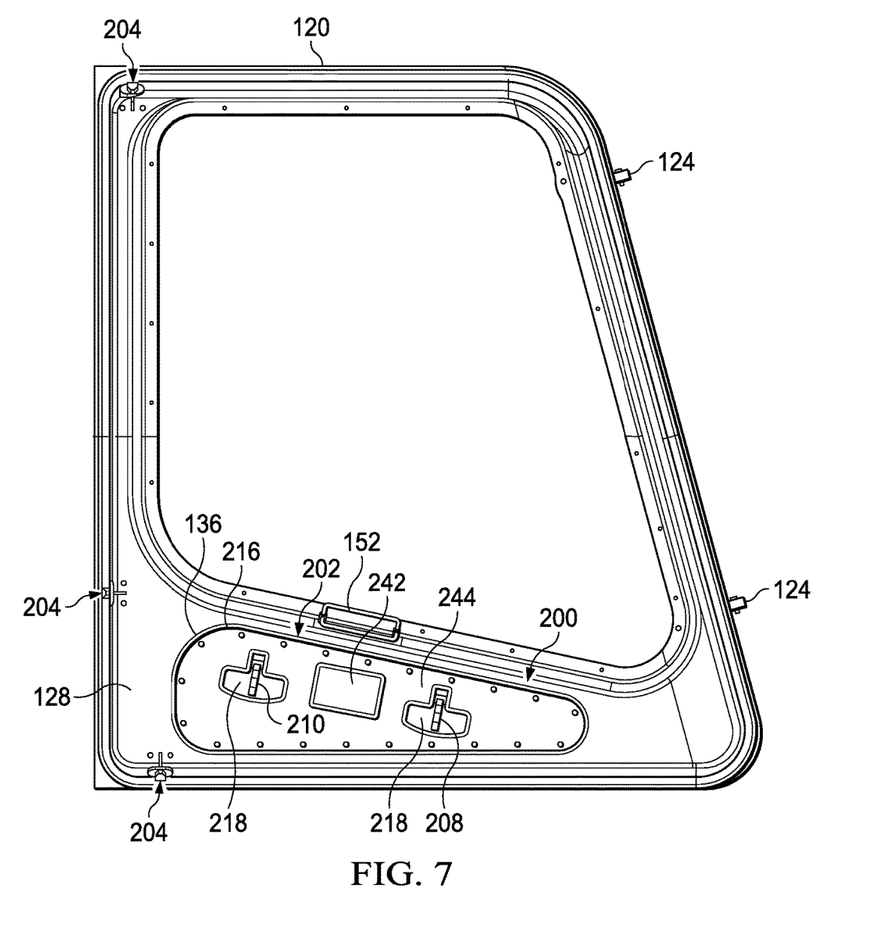
FIG. 7 is an orthogonal right side view of the fore left door of FIG. 3.
Figure 8:
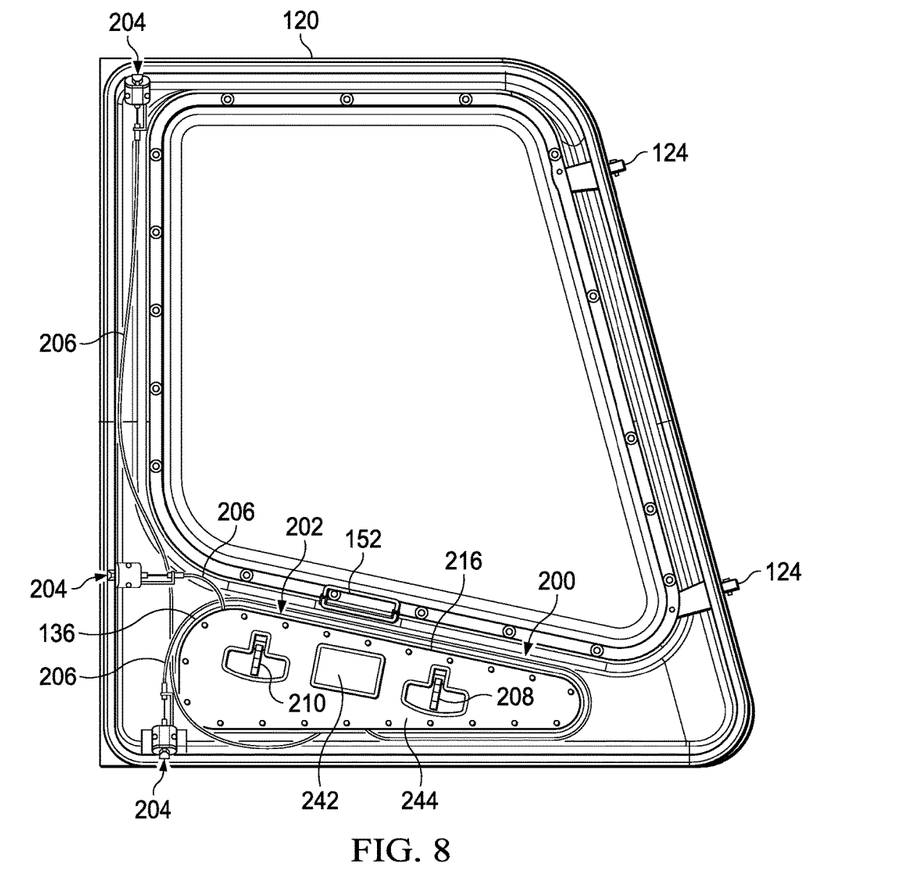
FIG. 8 is an orthogonal right side view of the fore left door of FIG. 7 with an interior wall represented as transparent and showing the modular latch system of the helicopter of FIG. 1.
Figure 9:
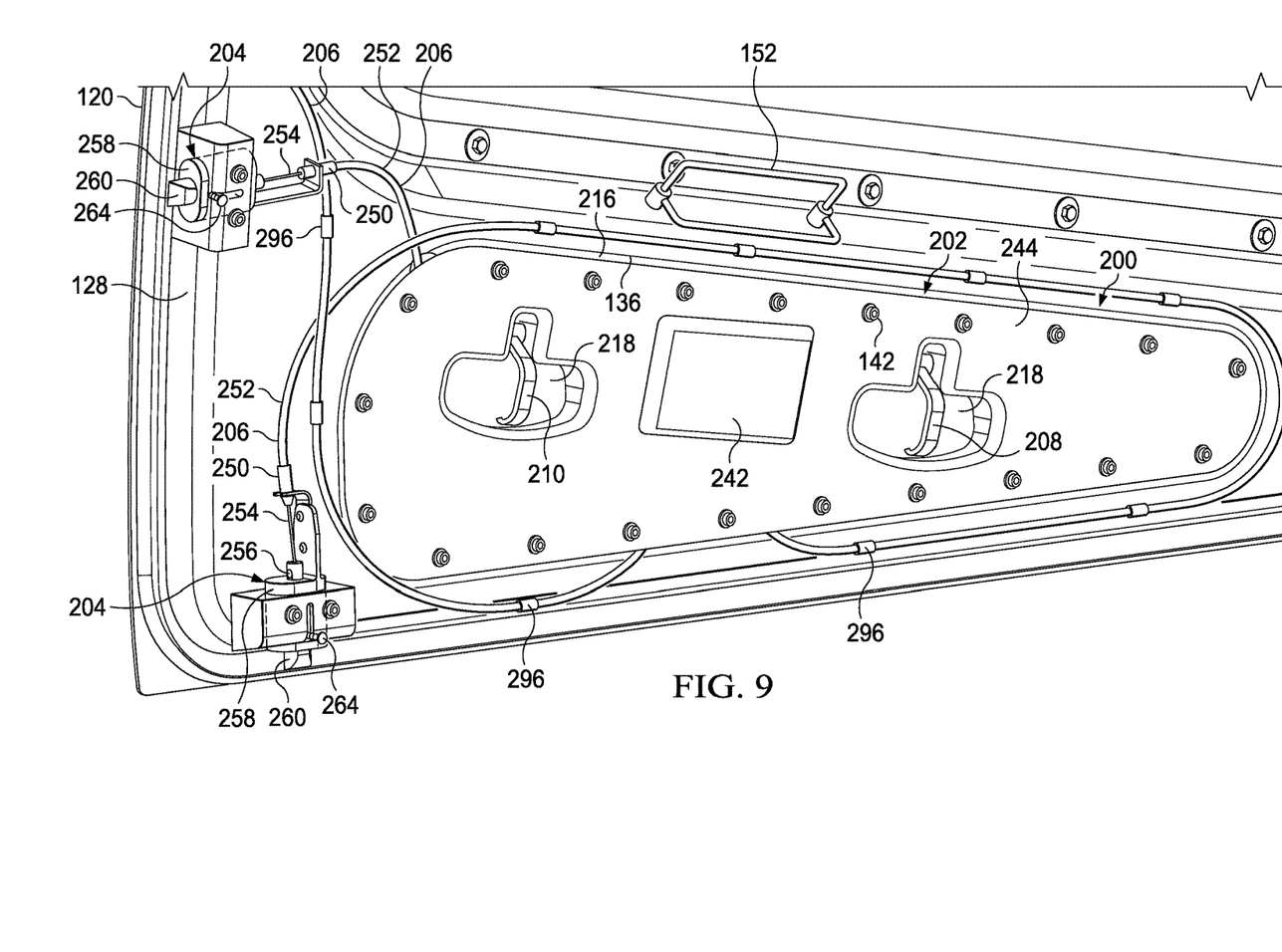
FIG. 9 is a partial oblique rear-right view of the fore left door of FIG. 7 with an interior wall represented as transparent and showing the modular latch system of the helicopter of FIG. 1.
Figure 10:
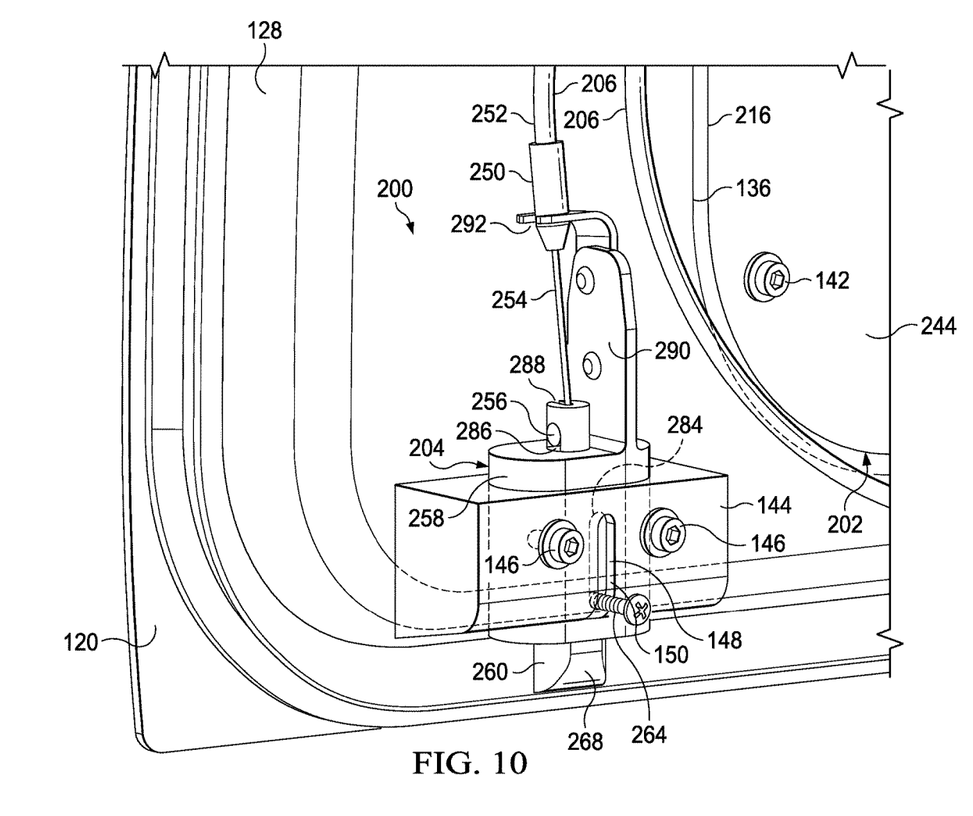
FIG. 10 is another partial oblique rear-right view of the fore left door of FIG. 7 with an interior wall represented as transparent but showing primarily a striker assembly of the modular latch system of the helicopter of FIG. 1.
Figure 11:
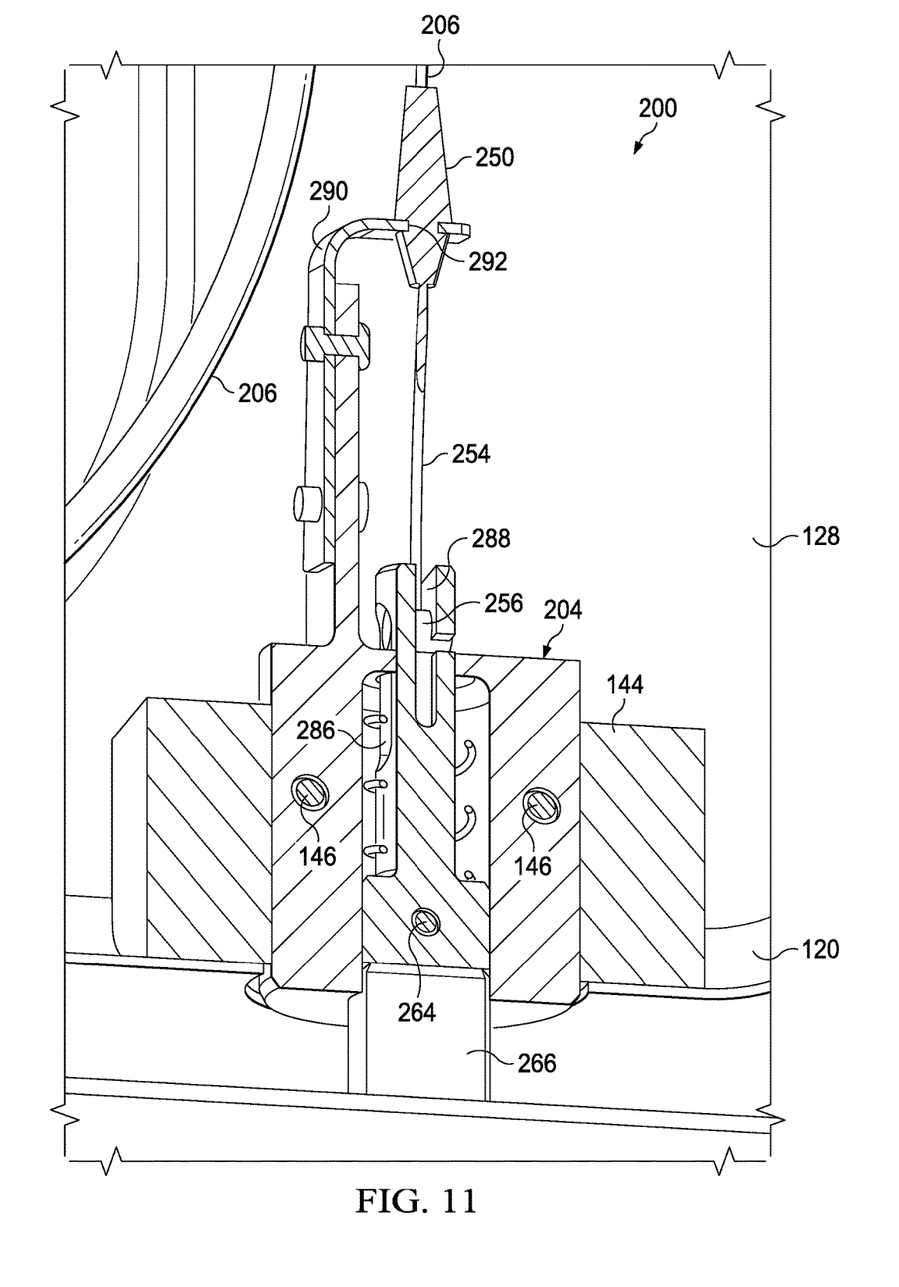
FIG. 11 is an oblique cutaway view of a striker assembly of the modular latch system of the helicopter of FIG. 1.
Figure 12:
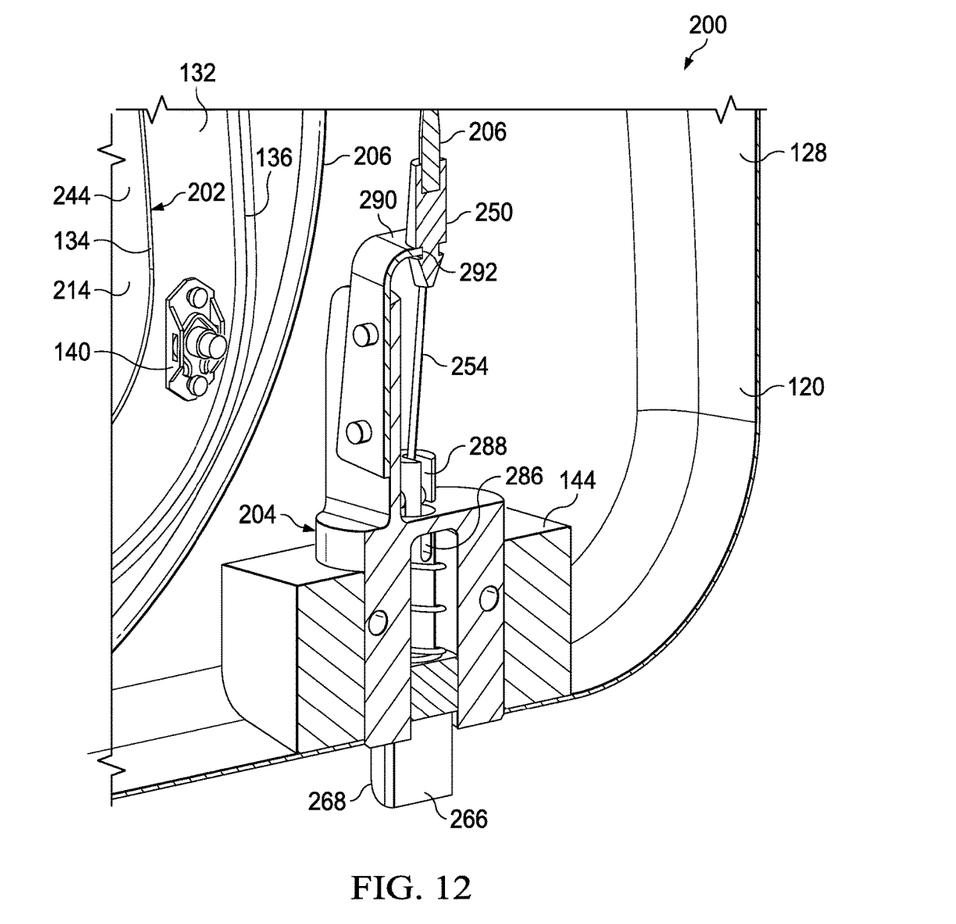
FIG. 12 is another oblique cutaway view of a striker assembly of the modular latch system of the helicopter of FIG. 1.
Figure 13:
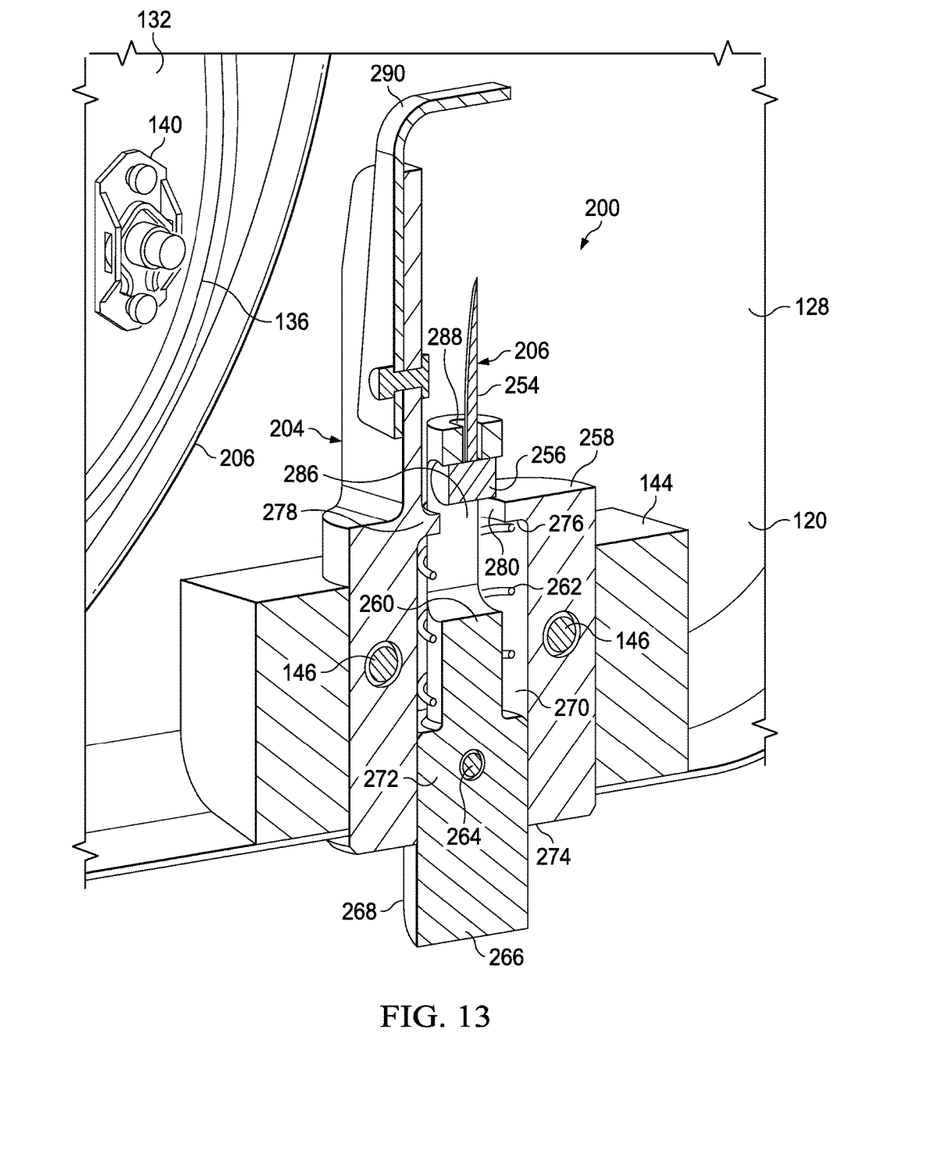
FIG. 13 is another oblique cutaway view of a striker assembly of the modular latch system of the helicopter of FIG. 1.

Referring primarily to FIGS. 5 and 7, each MLS 200 comprises an activation module 202 and a plurality of striker modules 204 connected to the activation module 202 using pull or push/pull type control cables 206. The activation module 202 comprises a fore handle 208, an aft handle 210, and an exterior handle 212, each of which is configured to selectively cause actuation of striker modules 204 via control cables 206.

Figure 6:
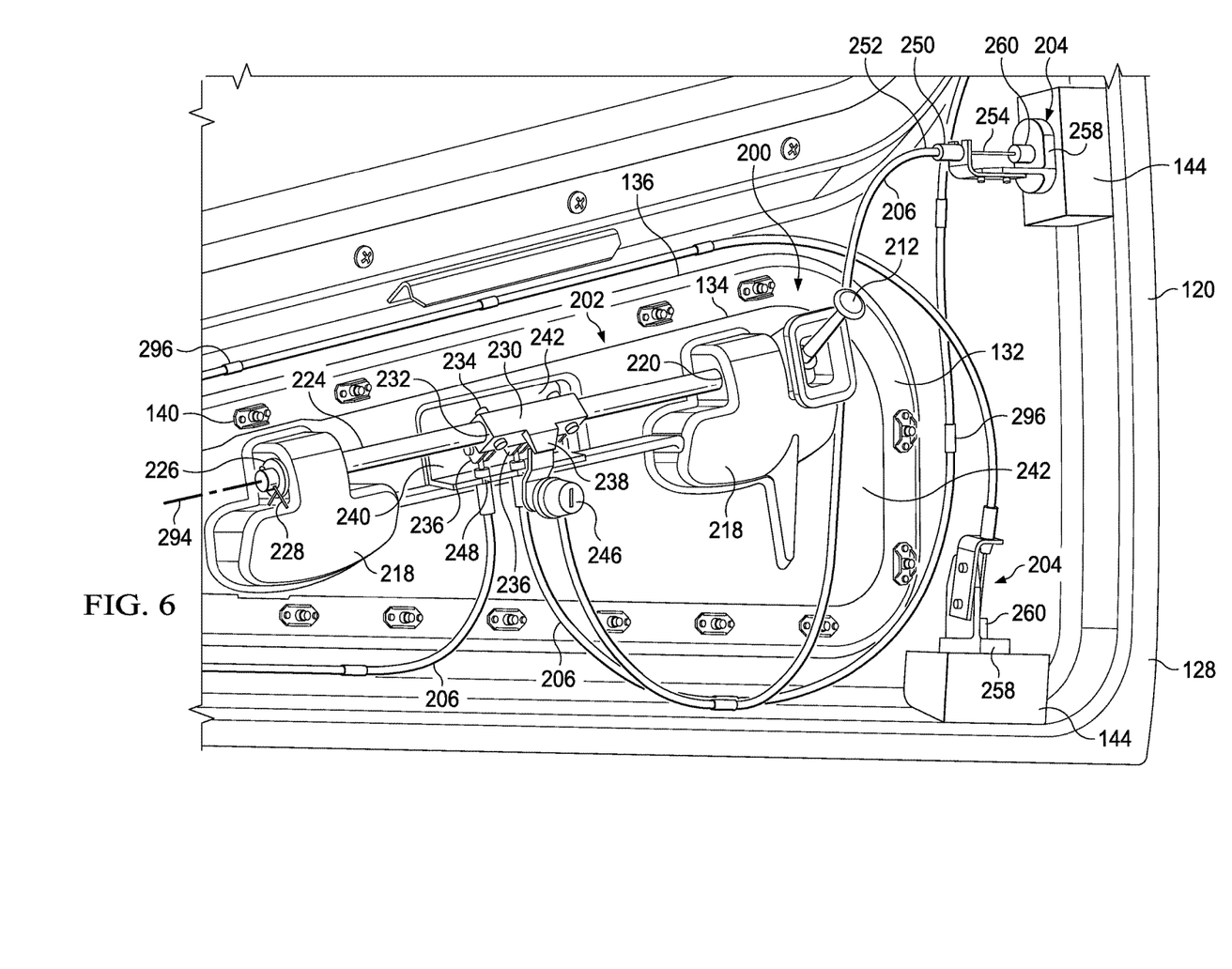
FIG. 6 is a partial oblique front-left view of the fore left door of FIG. 4 with an exterior skin removed and showing the modular latch system of the helicopter of FIG. 1.

Referring now primarily to FIG. 6, the activation module 202 comprises a carrier panel 214 that is configured for attachment to the interior panel 128. More specifically, the interior panel 128 comprises a recessed lip 132 that generally defines an insertion aperture 134 through which components of the MLS 200 can be inserted into an interior space of the fore left door 120. In this embodiment, a carrier perimeter 216 of the carrier panel 214 is substantially complementarily shaped but smaller relative to an outer perimeter 136 of the recessed lip 132. Accordingly, in some cases the carrier panel 214 can be mounted to the recessed lip 132 so that a right hand side 218 of the carrier panel 214 is substantially coplanar and/or flush with a right hand side 138 of the interior panel 128. In some cases, the interior side of the recessed lip 132 can comprise anti-rotation nuts 140 secured to the recessed lip 132 so that fasteners 142 can be passed through holes about the periphery of the carrier panel 214 and received by the nuts 140, thereby securing the carrier panel 214 relative to the interior panel 128.

The activation module 202 further comprises handle cavities 218 integrally formed into the carrier panel 214. When the carrier panel 214 is assembled to the recessed lip 132 the handle cavities 218 extend into the interior of the fore left door 120. The handle cavities 218 comprise coaxial rod apertures 220 configured to receive an activation rod 224 therethrough. In this embodiment, the activation rod 224 is longitudinally captured in position relative to the carrier panel 214 by application of washers 226 to the ends of the activation rod 224 after the activation rod 224 has been positioned to extend though the rod apertures 220 of each handle cavity 218 and subsequently inserting cotter pins 228 through radial holes of the activation rod 224.

The activation module 202 further comprises a conversion block 230 carried by the activation rod 224. The conversion block 230 receives the activation rod 224 through a block aperture 232 and is secured to the activation rod 224 using block fasteners 234 that extend through radial holes of the activation rod 224 and through the conversion block 230. The conversion block 230 further comprises cable tabs 236 that extend radially away from the activation rod 224. The conversion block 230 further comprises a lock tab 238. The lock tab 238 is configured to interface with a rotating lock 246 that is carried by the exterior panel 130.

The carrier panel 214 also carries an activation cable standoff 240. The activation cable standoff 240 is generally shaped as a bent plate and the activation cable standoff 240 is attached to a depressed wall 242 that is disposed further away from the interior of the fore left door 120 as compared to a primary wall 244 of the carrier panel 214. The activation cable standoff 240 comprises barrel slots 248, each configured to receive and retain a barrel 250 of a control cable 206. Each of the control cables 206 generally additionally comprise two barrels 250 that are connected to ends of a sleeve 252. Further, each of the control cables 206 comprise an interior cable 254 that extends through the barrels 250 and the sleeve 252 and which are terminated at both ends with a cylindrical cable end 256. In this embodiment, the cable ends 256 comprise a radial through hole through with the interior cables 254 are inserted and secured. The control cables 206 generally operate as a so-called Bowden cable so that mechanical force is transferred between the cable ends 256 by movement of the interior cable 254 relative to the hollow sleeve 252. While the primary actuation means is by pulling the interior cable 254, in some cases, the interior cable 254 can also be pushed to transmit force.

Referring now primarily to FIGS. 6 and 10-13, each striker module 204 generally comprises a striker housing 258, a striker 260, a striker spring 262, and a striker handle 264. In this embodiment, the striker housing 258 comprises an oval shaped outer profile and is configured to be received into a complementary hole of a mount block 144. In this embodiment, three mount blocks 144 are provided. One mount block 144 is located near a lower aft portion of the fore left door 120 so that the striker 260 can selectively extend downward beyond a portion of the interior panel 128 to selectively engage with a strike plate of the fuselage 102 (not shown) or other structure comprising a receiving aperture. Another mount block 144 is located along an aft portion of the fore left door 120 so that the striker 260 can selectively extend aft and beyond a portion of the interior panel 128 to selectively engage with a strike plate of the fuselage 102 (not shown) or other structure comprising a receiving aperture. Yet another mount block 144 is located along an upper portion of the fore left door 120 so that the striker 260 can selectively extend upward and beyond a portion of the interior panel 128 to selectively engage with a strike plate of the fuselage 102 (not shown) or other structure comprising a receiving aperture. In this manner, the three latches 260 extend in three different directions to selectively engage the fuselage 102. The latch modules 204 are secured to the mount blocks 144 using mount fasteners 146.

The latches 260 comprise a tapered tongue 266 configured so that a tapered tongue face 268 faces a latch plate (not shown) or other structure associated with the fuselage 102. The latch housings 258 comprise a latch bore 270 configured to complement a slide section 272 of the latch 260 from which the tapered tongue 266 extends. While the latch bore 270 comprises an insertion end 274 sized and shaped to accept insertion of the latch 260, a stop end 276 of the latch bore 270 terminates at a neck wall 278 of the latch housing 258 that comprises a neck hole 280 that is too small for the slide section 272 to fit through. However, a latch neck 282 that extends from the slide section 272 comprises a smaller outer diameter and/or perimeter relative to the slide section 272. The size and shape of the latch neck 282 is selected to fit through the neck hole 280. Further, the latch spring 262 is captured within the latch bore 270 between the slide section 272 and the neck wall 278. Additionally, the latch 260 is longitudinally captured within the latch bore 270 by passing the latch handle 264 through a closed perimeter housing handle slot 284 of the latch housing 258. The latch handle 264 additional extends through a complementary open mount slot 148 of the mount block 144 and a complementary open interior panel slot 150 of the interior panel 128. The latch handle 264 can additionally serve as a visual indicator of a position of the latch 260.

The latches 260 further comprise a longitudinal channel 286 formed in the latch neck 282. The longitudinal channel 286 is sized and shaped to allow significant longitudinal displacement of the cable end 256 therein. In this embodiment, the interior cable 254 extends a cable slot 288 formed at the end of the latch neck 282. In essence, the latch 260 is biased away from the cable end 256 so that the tapered tongue 266 extends as far out of the latch housing 258 as allowed by the latch handle 264 that stops such extension by contacting an end of the housing handle slot 284. The latch 260 is limited in longitudinal movement within the latch bore 270 in the opposite direction (toward the cable end 256)

when the latch handle 264 contacts an opposite end of the housing handle slot 284. In this embodiment, the barrel 250 associated with the latch module 204 is retained by a latch barrel standoff 290 in a latch barrel slot 292. The latch barrel standoff 290 extends from the latch housing 258 into the interior of the fore left door 120.

Referring primarily to FIG. 6, the MLS 200 is shown in a locked and unactuated state in which the activation rod 224 is prevented from rotation about a rod axis 294 in a clockwise direction when the activation rod 224 is viewed from a fore end. In this embodiment, the MLS 200 can be placed in an unlocked and unactuated state by rotating the lock 246 componentry out of a rotational path of the lock tab 238. While not shown, each of the fore handle 208, aft handle 210, and exterior handle 212 are connected to the activation rod 224 so that each can act as a substantially rigid lever arm useful in rotating the above-described clockwise direction from the state shown in FIG. 6. In operation, with the MLS 200 in the unlocked unactuated state, any of the fore handle 208, aft handle 210, and exterior handle 212 can be rotated clockwise to cause clockwise rotation of the activation rod 224 and accordingly place the MLS 200 in some degree of an actuated state. The clockwise rotation of the activation rod 224 causes clockwise rotation of the conversion block 230. Because the cables ends 256 are carried within the cable tabs 236 of the conversion block 230 and because the barrels 250 are restrained from movement by the activation cable standoff 240, the clockwise rotation of the activation rod 224 causes the interior cable 254 to be put in tension and urged away from the barrels 250 associated with the activation cable standoff 240. When sufficient rotational force is applied, an amount of the interior cable 254 extending from the barrels 250 will increase, causing an equal reduction in the amount of interior cable 254 extending from the barrels 250 associated with the latch barrel standoff 290. Accordingly, the clockwise rotation of the activation rod 224 results in movement of the latch 260 toward the interior of the fore left door 120. With sufficient movement of the latch 260, the latch 260 may become disengaged from a latch plate (not shown) of the fuselage 102 or other feature of fuselage 102 so that the MLS 200 is generally in an unlocked state that allows opening of the fore left door 120. Once the fore left door 120 is opened and when each of the fore handle 208, aft handle 210, and exterior handle 212 are released, the biasing force of the latch spring 262 can cause counterclockwise rotation of the activation rod 224 back to the unlocked and unactuated state. To close the fore left door 120 from an opened position, the fore left door 120 can simply be pushed shut from the outside or pulled shut using a pull handle 152 that is attached to the interior panel 128.

In the event that a latch 260 becomes lodged within the latch housing 258 in an at least partially retracted state, the activation rod 224 can nonetheless be rotated to allow return of the remaining latches 260 to their fully extended states because the cable ends 256 associated with the lodged latch 260 can travel along the length of the longitudinal channel 286. Accordingly, failure of one of the latch modules 204 will not prevent operation of other latch modules 204. Further, a lodged latch 260 can be manually dislodged and operated by moving the latch handle 264 along the housing handle slot 284.

In addition to providing the functionality described above, the MLS 200 offers efficiencies in manufacturing and assembly of the fore left door 120. For example, rather than assembling a great number of components directly to an interior of the fore left door 120, the entirety of the activation module 202 can be bench assembled in a location removed from the interior of the fore left door 120. Similarly, each of the latch modules 204 can be bench assembled in a location removed from the interior of the fore left door 120. In one method of installing an MLS 200 to a fore left door 120, the activation module 202 and the latch modules 204 are first bench assembled or otherwise fully prepared for insertion into an interior of the fore left door 120. Next, the control cables 206 can be connected to the activation module 202. Next, each of the activation module 202 and the latch modules 204 can be attached to the interior panel 128. Next, the remaining ends of the control cables 206 can be connected to their respective latch modules 204. Finally, the control cables 206 can be secured within the interior of the fore left door 120 by clipping them into cable guides 296 that are attached to the interior panel 128. Alternatively, the control cables 206 can be connected to the latch modules 204 before the latch modules 204 are connected to the interior panel 128. Of course, the MLS can alternatively be assembled in any suitable order while still maintaining the benefit of the preassembled activation module 202 and latch modules 204.

While the majority of components of the MLS 200 can be identical for both the fore left door 120 and the fore right door 116, at least the interior panel 128 can be provided in side specific versions while still providing the benefits and functionality of the MLS 200 described above that is utilized with the fore left door 120. In some cases, the MLS 200 can be configured for use with doors so that the carrier panel 214 forms a portion of the visible aesthetic interior of the doors visible from within a cabin of the fuselage 102.

While the MLS 200 is primarily described above as being used with a helicopter 100, in alternative embodiments, the MLS 200 can be utilized in conjunction with any other device or structure that moves one object (such as a door or window) relative to another. Specifically, the MLS 200 can be incorporated into left doors, right doors, fore doors, aft doors, and doors of airplanes and/or any other vehicle. Still further, the MLS 200 can be utilized in other non-vehicle application while still providing the same modular assembly and functionality. While not shown, it will be appreciated that the helicopter 100 and/or any other system into which the MLS 200 is incorporated, can comprise a strike plate comprising a hole or any other suitable structure for receiving the pin latch 260 and securing a door relative to the structure. Further, the latch systems disclosed are independent of door frames so that the mechanisms can be properly operated and/or quality inspected without being mounted to a door frame. While the MLS 200 is shown as being located in particular locations relative to a door, in alternative embodiments, the MLS 200 can be located at different locations, such as a lock portion of the MLS 200 being located lower than as depicted in the Figures. Still further, while the helicopter 100 is shown comprising four doors, an alternative embodiment of a helicopter comprising the MLS 200 can comprise a fore left door, an aft left door, and a fore right door without including an aft right door. In other alternative embodiments of a helicopter comprising the MLS 200, a helicopter can comprise only one door or two doors, such as, but not limited to comprising only a fore left door and a fore right door or only a fore left door or a fore right door. In other embodiments, the MLS 200 can be used on any one or more of an aft right door, aft left door, fore right door, and fore left door, and/or any other door carried by the helicopter.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention.

What is claimed is:

1. A modular latch system, comprising:
an activation module comprising an activation rod;
a latch module comprising a biased latch; and
a control cable connecting the activation module to the latch module so that rotation of the activation rod can retract the latch;
wherein the latch comprises a longitudinal channel configured to capture a cable end of the control cable and wherein the cable end can be moved longitudinally relative to the latch without moving the latch; wherein the latch module comprises a latch handle connected to the latch and wherein actuation of the latch handle can move the latch without requiring rotation of the activation rod.

2. The modular latch system of claim 1, further comprising:
a plurality of latches, each connected to the activation module by separate control cables.

3. The modular latch system of claim 1, further comprising:
a conversion block carried by the activation rod, the conversion block comprising cable tabs configured for connection to the control cable;
wherein the cable tabs receive and retain a cable end of the cable.

4. The modular latch system of claim 3, wherein the conversion block comprises a lock tab.

5. The modular latch system of claim 1, further comprising:
a carrier panel comprising handle cavities;
wherein the activation rod is disposed in rod apertures of the handle cavities.

6. The modular latch system of claim 5, further comprising:
a handle connected to the activation rod, the handle being at least partially disposed within one of the handle cavities.

7. An aircraft door, comprising:
an interior panel;
an exterior panel connected to the interior panel to define an interior of the door;
an activation module carried by the interior panel, the activation module comprising an activation rod;
a latch module carried by the interior panel at a location remote from the activation module, the latch module comprising a biased latch; and
a control cable connecting the activation module to the latch module so that rotation of the activation rod can retract the latch;
wherein the latch comprises a longitudinal channel configured to capture a cable end of the control cable and wherein the cable end can be moved longitudinally relative to the latch without moving the latch; wherein the latch module comprises a latch handle connected to the latch and wherein actuation of the latch handle can move the latch without requiring rotation of the activation rod.

8. The aircraft door of claim 7, further comprising:
a conversion block carried by the activation rod, the conversion block comprising cable tabs configured for connection to the control cable;
wherein the cable tabs receive and retain a cable end of the cable.

9. The aircraft door of claim 8, further comprising:
a lock carried by the exterior panel; and
a lock tab carried by the conversion block;
wherein the lock selectively prevents rotation of the activation rod by selectively obstructing rotation of the lock tab.

10. The door of claim 7, the activation module comprising:
a carrier panel comprising handle cavities;
wherein the activation rod is disposed in rod apertures of the handle cavities.

11. The aircraft door of claim 10, further comprising:
a handle connected to the activation rod, the handle being at least partially disposed within one of the handle cavities.

12. The aircraft door of claim 7, further comprising:
an exterior handle connected to the activation rod, the exterior handle extending through an aperture of the exterior panel.

13. The aircraft door of claim 7, wherein the aircraft comprises a helicopter.

14. An aircraft door, comprising:
an interior panel;
an exterior panel connected to the interior panel to define an interior of the door;
an activation module carried by the interior panel, the activation module comprising an activation rod;
a latch module carried by the interior panel at a location remote from the activation module, the latch module comprising a biased latch;
a control cable connecting the activation module to the latch module so that rotation of the activation rod can retract the latch;
a conversion block carried by the activation rod, the conversion block comprising cable tabs configured for connection to the control cable, wherein the cable tabs receive retain a cable end of the cable;

a lock carried by the exterior panel; and a lock tab carried by the conversion block, wherein the lock selectively prevents rotation of the activation rod by selectively obstructing rotation of the lock tab.

* * * * *